Patented June 9, 1931

1,809,755

UNITED STATES PATENT OFFICE

GEORGE KING AND RICHARD THRELFALL, OF BIRMINGHAM, ENGLAND

MATERIAL FOR FORMING COATINGS, FOR USE AS IMPREGNATING AGENTS OR FOR LIKE PURPOSES

No Drawing. Application filed February 7, 1928, Serial No. 252,669, and in Great Britain February 16, 1927.

This invention relates to a material which is useful for application to a surface to form a coating thereon; or for impregnating materials or substances for strengthening, stiffening, dressing or preserving them, as for instance, stiffening textile fabrics or preserving stone; or for mixing with materials to make plastic masses; or for other like purposes.

The material consists of or comprises a solution, produced as hereinafter described, of silica in a non-aqueous solvent or a mixture of non-aqueous solvents. Such a solution has been found to be more useful than an aqueous solution or an aqueous-alcoholic solution for the purposes above-named, particularly for producing a continuous film of silica suitable as a coating.

The solution of silica is made by reaction between an ester of silicic acid and water in presence of a solvent for the ester and also for water. This solvent, however, may contain the water, or some of the water, required for the reaction. The proportion of water must not exceed that required to convert the ester into the corresponding alcohol and silica. Hence an alcohol must always be a constituent of the solution of silica produced, although an alcohol is not necessarily the solvent used, since a ketone, such as acetone, toluene and other non-aqueous solvents may be used.

The term ester of silicic acid includes any alkyl silicate or condensed silicate; for instance tetra-ethyl silicate, hexa-ethyl silicate or a mixture thereof.

The ethyl ester of silicic acid, or the mixture of ethyl esters of silicic acid produced in the known manufacture, is preferred as parent material. However, other alkyl esters of silicic acid may be used, such as methyl or butyl ester or a mixture thereof.

When the proportion of water used for the reaction is the maximum permissible there is obtained a solution which in course of time sets to a gel free from water and from ester; some time is required before the reaction can be regarded as complete.

In many cases, however, it is of advantage, particularly when the solution is to be used as a medium for painting, that the solution should contain undecomposed ester, that is to say the proportion of water used should be in deficiency of that required to decompose the ester.

The solution, which may conveniently be called the basis material, whether it contains undecomposed silicic acid ester or not, is a more or less viscous liquid, which has the property when exposed to the atmosphere that it dries wholly or in part and becomes a form of silica. Thus the basis material may be applied to a surface exposed to the atmosphere and allowed to dry or set, for forming a coating in the nature of a varnish or layer, or it may be mixed with pigments or the like before it is so applied, to furnish a paint. Or the basis material may be absorbed in a textile fabric and allowed to dry to stiffen or dress the fabric, or to make it less inflammable. Since it is readily absorbed by many building materials the basis material may be applied to stonework, brickwork, woodwork or the like for preserving the work. The basis material is also useful as an adhesive.

A suitable method for making the basis material consists in mixing a silicic acid ester with a solvent or mixture of solvents adapted to carry water either in solution or dispersion, for instance methylated spirit or other form of alcohol, or acetone, the proportion of water thus brought into contact with the ester being adjusted so that the material, after reaction is complete, contains no free water; a proportion of water short of that fulfilling this condition may, of course, be used.

The basis material may be used as such or it may be made less viscous by dilution with a suitable solvent, such as acetone; in the original or in the diluted condition it may be mixed in any desired proportion with one or more other substances, which may have the purpose of controlling the rate of drying or setting. For example, a solution of the basis material may be mixed with a non-volatile or slowly volatile solvent or softening agent which will remain with the silica in the dried product for a long or short time, such as carbon tetrachloride, turpentine, bromnaphthalene, a fatty oil, particularly tung oil, shellac, soluble synthetic resins, essential oils, like oil of cassia, or the like. The basis material may act as an agent for improving the properties of such added substance for its normal purpose, for instance, by increasing the rate of drying of an oil paint. In other cases the basis material may be added as a stiffening agent or for diminishing the inflammability as when added to a pyroxylene lacquer.

When the basis material is used as a medium for painting, it is for some purposes only necessary to incorporate in the medium a suitable pigment, or a material which is not strictly speaking a pigment, (but is hereinafter included in the term "pigment"), such as powdered steatite, natural stone powder or glass. For other purposes the further additions indicated above may be made, so that the finished coating may contain organic matter other than any that may be present as organic pigment.

Since a paint made by mixing certain pigments with the basis material is apt to set in a short time, it is generally preferable to supply the painter with the pigment mixed with a solvent which will not interfere with the normal setting or drying of the basis material and also with the basis material, so that these two components may be mixed at the time of use. Suitable solvents of this kind are cyclohexanol, glycol or tetrahydronaphthalene.

In applying the basis material in the art or industry of painting there are certain conditions to be observed in order that the best results may be attained. Generally speaking, alcohol is the best solvent and the proportion of ester, alcohol and water mixed together, within the limits prescribed by the invention, to make the basis material, may be varied considerably.

Examples are given hereinafter of the manufacture of paints with this basis material, but it must be stated that different samples of a pigment sold under the same name are apt to differ in their behaviour towards the basis material, so that trial is generally necessary for ascertaining whether any given sample of pigment will give a successful paint.

A suitable mixture of ethyl silicates for use in the invention is made by the action of 1.3–1.5 parts by volume of alcohol of about 95 per cent. strength on 1 part by volume of silicon tetrachloride. Equal volumes of the liquids are brought together whilst stirring, preferably by causing a stream of spirit to mix with a stream of silicon tetrachloride. The remaining alcohol, namely from 0.3–0.5 volume, is then added, also with stirring. It is convenient before this further addition to heat the mixture of equal volumes, stirring being continued, so as to facilitate the escape of the hydrochloric acid gas which is in solution.

After the mixing of the additional alcohol, which is made at ordinary temperature, the temperature of the liquid is raised to about 100° C. and a stream of dry air is passed. This has for its object the final removal of traces of hydrochloric acid and also of chloresters which will probably be present in small quantities. Finally, the liquid is treated with some form of active carbon which is then removed by filtration.

The application of such a mixture of esters for making varnishes and paints is illustrated by the following examples, concerning which it must be said that in making a solution by mixing the esters with the mixture of water and solvent the esters should be added gradually to the mixture of water and solvent, not in the alternative manner.

*Example 1.*—315 litres of the mixture of esters are added gradually with stirring to 50.7 litres of water dissolved in 135 litres of alcohol of 94 per cent. strength. The mixture which at first separates into two layers, is stirred until a uniform solution is obtained. To the solution so obtained a further 250 litres of the mixture of esters is added to give a solution useful as a varnish and referred to below as the basic solution.

*Example 2.*—315 litres of the mixture of esters are added with stirring to 58.3 litres of water dissolved in 135 litres of a solvent consisting of 80 per cent. of alcohol of 94 per cent. strength and 20 per cent. of acetone. The mixture is then treated as in Example 1, and to the solution obtained a further 250 litres of the mixture of esters are added. The solution is useful as a varnish and can be used as the equivalent of the solution of Example 1.

*Example 3.*—440 kilos of titanium oxide pigment are ground with 315 litres of the mixture of esters and the paste so formed is used instead of the 315 litres of mixture of esters in the operation described in Example 1 or 2, for the purpose of making a paint.

*Example 4.*—440 kilos of titanium oxide pigment are ground with 315 litres of mixture of esters as in Example 3 and the paste so formed is added with stirring to 50.7 litres of water dissolved in 135 litres of alcohol of 94 per cent. strength, as in Example 1, or to a mixture of solvents as in Example 2.

To the solution so obtained there is added a paste consisting of 250 litres of the mixture of esters and 350 kilos or any desired suitable quantity of ultramarine blue or other pigment. The paint so made is thinned by the addition of a quantity of basis solution with or without a further addition of a non-aqueous solvent.

*Example 5.*—7 kilos of red oxide of iron pigment are ground with 10 kilos of basis solution made as described in Example 1 for the purpose of producing a paint.

*Example 6.*—To 175 kilos of finely powdered glass or other suitable, physically similar material, are added 100 litres of basis solution prepared as described in Example 1 for the purpose of producing a surface for painting. The mixture is in the form of a paste and is also useful for use as a plaster or mortar, or as an adhesive for making joints in masonry or for surfacing.

*Example 7.*—319 kilos of tetra-butyl silicate are added with stirring to 54 litres of water dissolved in 200 litres of acetone. The mixture which separates into two layers is stirred until a uniform solution is obtained. To the solution so obtained a further 252 kilos of tetra-butyl silicate are added to give a varnish. The solution obtained in this example may be mixed with 577 kilos of titanium oxide pigment to form a paint.

*Example 8.*—153 litres of tetra-methyl ester of silicic acid are added with stirring to 57 litres of water dissolved in 20 litres of methyl alcohol. To the solution so obtained a further 121 litres of tetra-methyl ester of silicic acid are added to give a varnish. To the solution obtained in this example 246 kilos of titanium oxide may be added to make a paint.

*Example 9.*—60 kilos of ultramarine blue or other pigment in desired suitable quantity are ground into a paste with 35 kilos of cyclohexanol; the paste so made is permanent and may be mixed with the basis solution as described in Example 1, as required, to form a paint.

*Example 10.*—3 litres of basis solution, made as directed in Example 1, are added to 1 litre of linseed oil paint of the following composition (see Paint & Wall Paper, vol. 1, No. 1, November 1926, page 24):—

| | Volumes |
|---|---|
| Pale boiled oil | 60 |
| Turpentine | 20 |
| Stand oil | 10 |
| Liquid dryers | 2½ |

The linseed oil paint not being soluble in the basis solution the mixture is emulsified by suitable agitation and may then be ground with a pigment.

The speed of drying of the paint is enhanced.

*Example 11.*—3 litres of the basis solution, made as described in Example 1, are mixed with 1 litre of butyl tartrate. These components are mutually soluble and the rate of drying of the silica ester medium is retarded.

*Example 12.*—3 litres of basis solution, made as described in Example 1, are mixed with 1 litre of a commercial amyl acetate pyroxylene lacquer, whereby the inflammability of the surface lacquered with the mixture is reduced as compared with a surface lacquered with the pyroxylene lacquer only.

It is to be understood that the appended claims, where the expression "a silicic acid alkyl ester" is used, it is intended to include both a single silicic acid alkyl ester as well as as mixture of two or more such esters, since it will be clear from the preceding description that both the use of a single ester and the use of a mixture of esters are equally within the scope of the invention. Similarly, where the term "solvent" is used, it is intended to include both a single solvent and a mixture of two or more solvents.

Having thus described the nature of the said invention and the best means we know of carrying the same into practical effect, we claim:—

1. A process of making a solution of silica, which process comprises treating a silicic acid alkyl ester in presence of a solvent for the ester and for water, with a proportion of water not exceeding that required to decompose the ester completely.

2. A process of making a solution of silica, which process comprises mixing a silicic acid alkyl ester with aqueous alcohol containing a quantity of water that does not exceed that required to decompose the ester completely.

3. A process of making a solution of silica, which process comprises treating a silicic acid alkyl ester in presence of a solvent for the ester and for water, with a proportion of water less than that required to decompose the ester completely.

4. A process of making a solution of silica, which process comprises mixing a silicic acid alkyl ester with aqueous alcohol containing a quantity of water that is less than that required to decompose the ester completely.

5. A process of making a solution of silica, which process consists in adding a silicic acid alkyl ester gradually to aqueous alcohol, whilst stirring, until a uniform solution is produced, and then adding to the uniform solution a further quantity of a silicic acid alkyl ester, the relative proportions of the ester and aqueous alcohol being such that the final mixture contains undecomposed silicic acid ester.

In testimony whereof we have signed our names to this specification.

GEO. KING. [L. S.]
RICHARD THRELFALL. [L. S.]